(12) United States Patent
Tsuku

(10) Patent No.: US 12,496,977 B2
(45) Date of Patent: Dec. 16, 2025

(54) STORAGE DEVICE

(71) Applicant: MORIROKU TECHNOLOGY COMPANY, LTD., Tokyo (JP)

(72) Inventor: Nobuhito Tsuku, Tokyo (JP)

(73) Assignee: MORIROKU CO., LTD., Tokyo (JP)

( * ) Notice: Subject to any disclaimer, the term of this patent is extended or adjusted under 35 U.S.C. 154(b) by 392 days.

(21) Appl. No.: 18/363,270

(22) Filed: Aug. 1, 2023

(65) Prior Publication Data

US 2024/0059225 A1 Feb. 22, 2024

(30) Foreign Application Priority Data

Aug. 18, 2022 (JP) ................................ 2022-130381
May 25, 2023 (JP) ................................ 2023-086521

(51) Int. Cl.
| | |
|---|---|
| B60R 7/00 | (2006.01) |
| B60Q 3/50 | (2017.01) |
| B60R 7/04 | (2006.01) |
| B60R 16/03 | (2006.01) |
| B60R 16/037 | (2006.01) |
| B60R 11/00 | (2006.01) |

(52) U.S. Cl.
CPC ............... B60R 7/04 (2013.01); B60Q 3/50 (2017.02); B60R 16/03 (2013.01); B60R 16/037 (2013.01); *B60R 2011/0007* (2013.01); *B60Y 2306/05* (2013.01); *B60Y 2306/07* (2013.01)

(58) Field of Classification Search
CPC ......... B60R 7/04; B60R 16/03; B60R 16/037; B60R 2011/0007; B60Q 3/50; B60Y 2306/05; B60Y 2306/07; B60N 2/793; E05D 3/02; E05Y 2900/538; E05B 83/32
USPC ....................................................... 296/24.34
See application file for complete search history.

(56) References Cited

U.S. PATENT DOCUMENTS

| | | | |
|---|---|---|---|
| 7,413,229 B2 * | 8/2008 | Kukucka ................ | B60N 2/793 296/1.09 |
| 2019/0023168 A1 * | 1/2019 | Wheeler ................... | B60R 7/04 |
| 2020/0275571 A1 * | 8/2020 | Kunii ..................... | B60L 15/007 |
| 2021/0053473 A1 * | 2/2021 | Chen ......................... | B60R 7/04 |
| 2024/0067096 A1 * | 2/2024 | Fukui ....................... | B60R 7/04 |

FOREIGN PATENT DOCUMENTS

JP 2006-341625 A 12/2006

* cited by examiner

*Primary Examiner* — Steven O Douglas
(74) *Attorney, Agent, or Firm* — Rankin, Hill & Clark LLP

(57) ABSTRACT

A storage device includes a storage unit that can store a thing or things therein, and a lid that can swing to open and close an upper face of the storage unit. The lid includes movable hinges provided on a rotary shaft, a main body supported by the movable hinges, a base portion supported by the main body, an electronic component provided on a part of an upper surface of the base portion, and a cable for feeding electricity to the electronic component. A part of the electronic component passes through an electronic component hole formed in the base portion, and the electronic component and the cable are connected to each other below the base portion.

8 Claims, 4 Drawing Sheets

STORAGE DEVICE

FIELD OF THE INVENTION

The present invention relates to a storage device.

BACKGROUND

In many vehicles, a storage device capable of storing things (personal belongings) is provided between a driver's seat and a passenger's seat. One of known storage devices can open and close an upper face of a storage unit by a lid that can swing upward and downward. The upper surface of the lid of the storage device may be used as an armrest for the driver/passenger. As a prior art related to such a storage device, there is a technique disclosed in JP-A-2006-341625.

A storage device such as the one disclosed in JP-A-2006-341625 includes a storage unit capable of storing things, and a lid that can swing upward and downward with respect to the storage unit. The lid has a hinge provided on a rotation shaft and also has an illumination unit. A predetermined space is formed in the hinge, and a part of a cable for feeding electricity to the illumination unit can extend through this space.

By allowing the cable to be received in the inner space of the hinge, it is possible to prevent the cable from bending when the lid swings, and to achieve a long service life.

SUMMARY

Because the storage device disclosed in JP-A-2006-341625 has the hinge that receives a part of the cable therein, the hinge is increased in size and the storage device as a whole is also increased in size. Therefore, it is desired to provide a storage device that is small in size and has a long service life.

An object of the present invention is to provide a storage device which is small in size and has a long service life.

According to one aspect of the present disclosure, there is provided a storage device that includes:
- a storage unit having an open upper face for storing a thing or things therein; and
- a lid that is swingable to open and close the upper face of the storage unit, and
- the lid includes a movable hinge provided on a rotational axis such that the hinge can rotate relative to the storage unit, a main body supported by the movable hinge and capable of opening and closing an opening of the storage unit, a base portion supported by the main body, a plate-like electronic component which is provided on a part of an upper surface of the base portion and to which electricity can be fed, and a cable for feeding electricity to the electronic component,
- the base portion has a hole used for the electronic component (electronic component hole), which penetrates the base portion from an upper surface to a lower surface of the base portion,
- a part of the electronic component extends through the electronic component hole, and
- the electronic component and the cable are connected to each other below the base portion.

According to the present invention, it is possible to provide a storage device which is small in size and has a long service life.

DETAILED DESCRIPTION OF THE PREFERRED EMBODIMENTS

Figure 1:
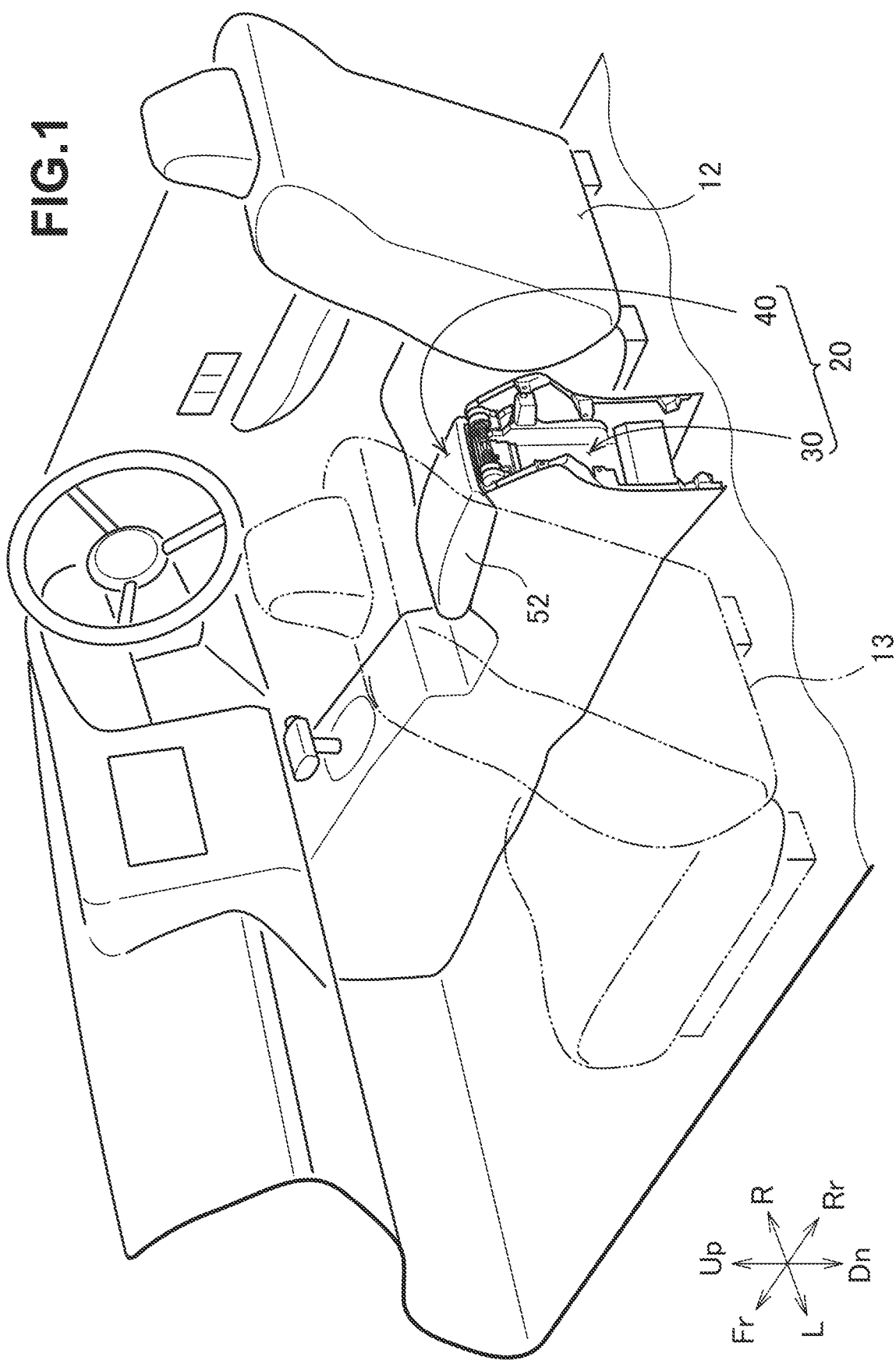
FIG. 1 is a perspective view of a vehicle's cabin (inside space of a vehicle) in which a storage device according to an embodiment of the invention is provided.

An embodiment of the present invention will be described below with reference to the accompanying drawings. It should be noted that in the following description, terms "left" and "right" refer to the left and right when viewed from a person in a vehicle, and terms "front" and "rear" refer to the front and rear when viewed in the traveling direction of the vehicle. In the drawings, "Fr" indicates the front, "Rr" indicates the rear, "Le" indicates the left when viewed from the person in the vehicle, "Ri" indicates the right when viewed from the person in the vehicle, "Up" indicates the top or up, and "Dn" indicates the bottom or down.

Embodiment(s)

The embodiment will be described with reference to the drawings.

FIG. 1 illustrated a passenger car cabin viewed from the left rear. A storage device 20 constitutes a part of a so-called center console extending in the front-rear direction at the center of the front area in the vehicle cabin. The storage device 20 is disposed between a driver's seat 12 (seat 12), on which a driver sits, and a passenger's seat 13 (seat 13). That is, the storage device 20 is provided on the sides of the seats 12 and 13 on which the persons can sit.

The top surface of the storage device 20 is located where an average sized person can place his or her elbow. Thus, the storage device 20 also serves as an armrest.

Figure 2:
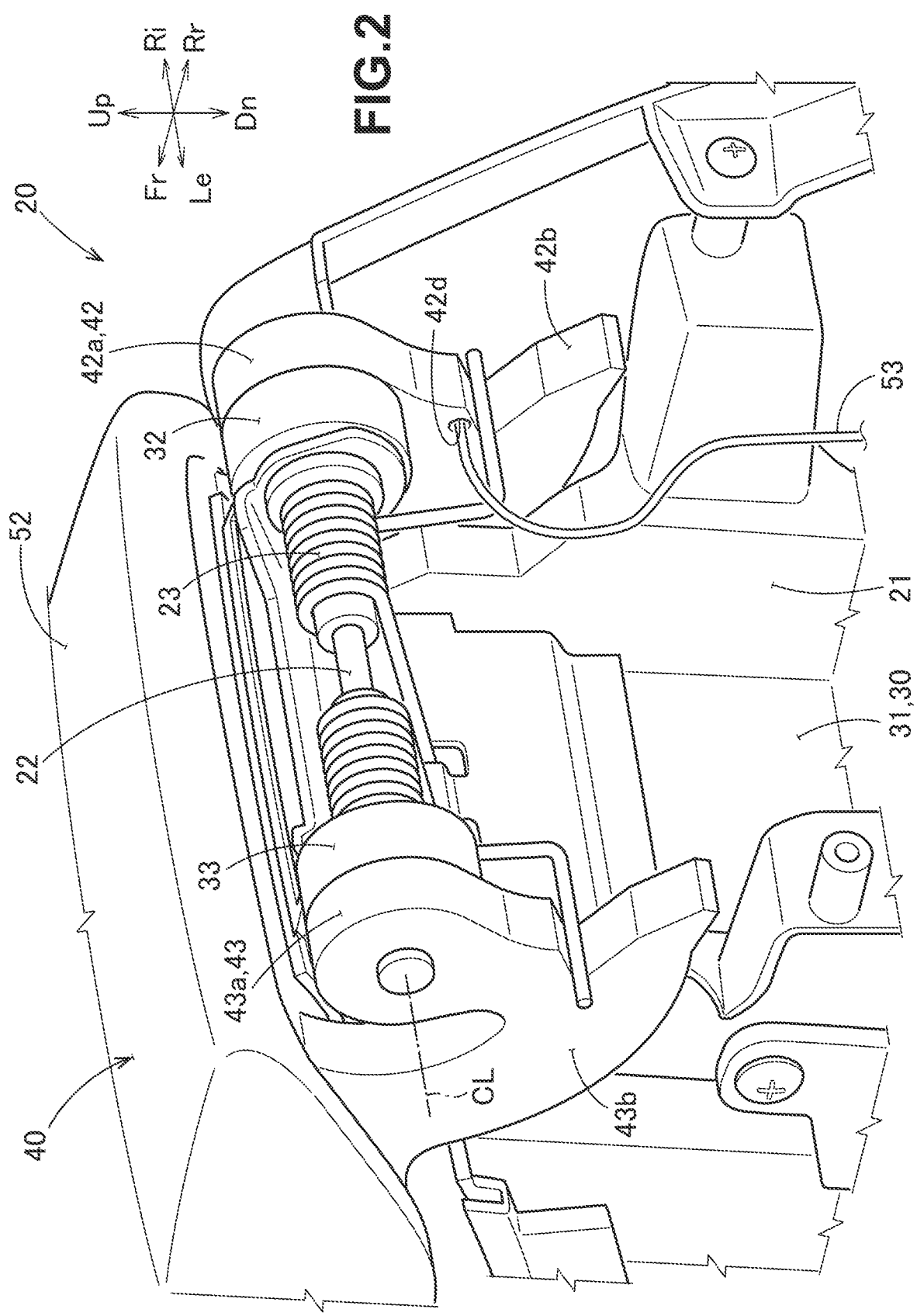
FIG. 2 is an enlarged view of a rear portion of the storage device illustrated in FIG. 1.

Referring to FIG. 2, the storage device 20 includes, as its major parts, a storage unit having an open upper face for storing a thing or things therein, a shaft member 22 fixed to a rear portion of the storage unit 30 and extending in the left-right direction, a spring 23 supported by the shaft member 22 and partially fixed to the storage unit 30, and a swingable lid 40 to open and close the upper face of the storage unit 30.

By releasing a lock (not illustrated) provided at the front portion of the lid 40, the front end of the lid 40 swings upward and rearward around the shaft member 22. As a result, the upper portion of the storage unit 30 is opened. Then, the person(s) in the vehicle can put a thing or things in the storage unit 30 and take the thing(s) from the storage unit 30. By swinging the front end of the lid 40 downward and forward, the upper portion of the storage unit 30 is closed by the lid 40.

The storage unit 30 is a box-shaped member made of resin. The storage unit 30 includes a storage unit main body 31 having an open upper face and capable of receiving a thing or things therein, and fixed hinges 32 and 33 extending rearward respectively from the left and right sides of the rear face of the storage unit main body 31 to support the shaft member 22. The fixed hinges 32 and 33 are integrally formed with the storage unit main body 31.

The shaft member 22 is a solid rod-shaped member. A line passing through the center of the shaft member 22 is referred to as a rotational axis CL. The rotational axis CL serves as an axis of rotation (swinging) for the lid 40 when the lid 40 swings. The shaft member 22 may have a hollow cylindrical shape, but is preferably a solid member. This is because the small shaft member 22 can be used as compared with the case of the hollow cylindrical shape, and the storage device 20 can be made compact.

The spring 23 is a helical torsion spring and biases the lid 40 in the opening direction.

Figure 3:
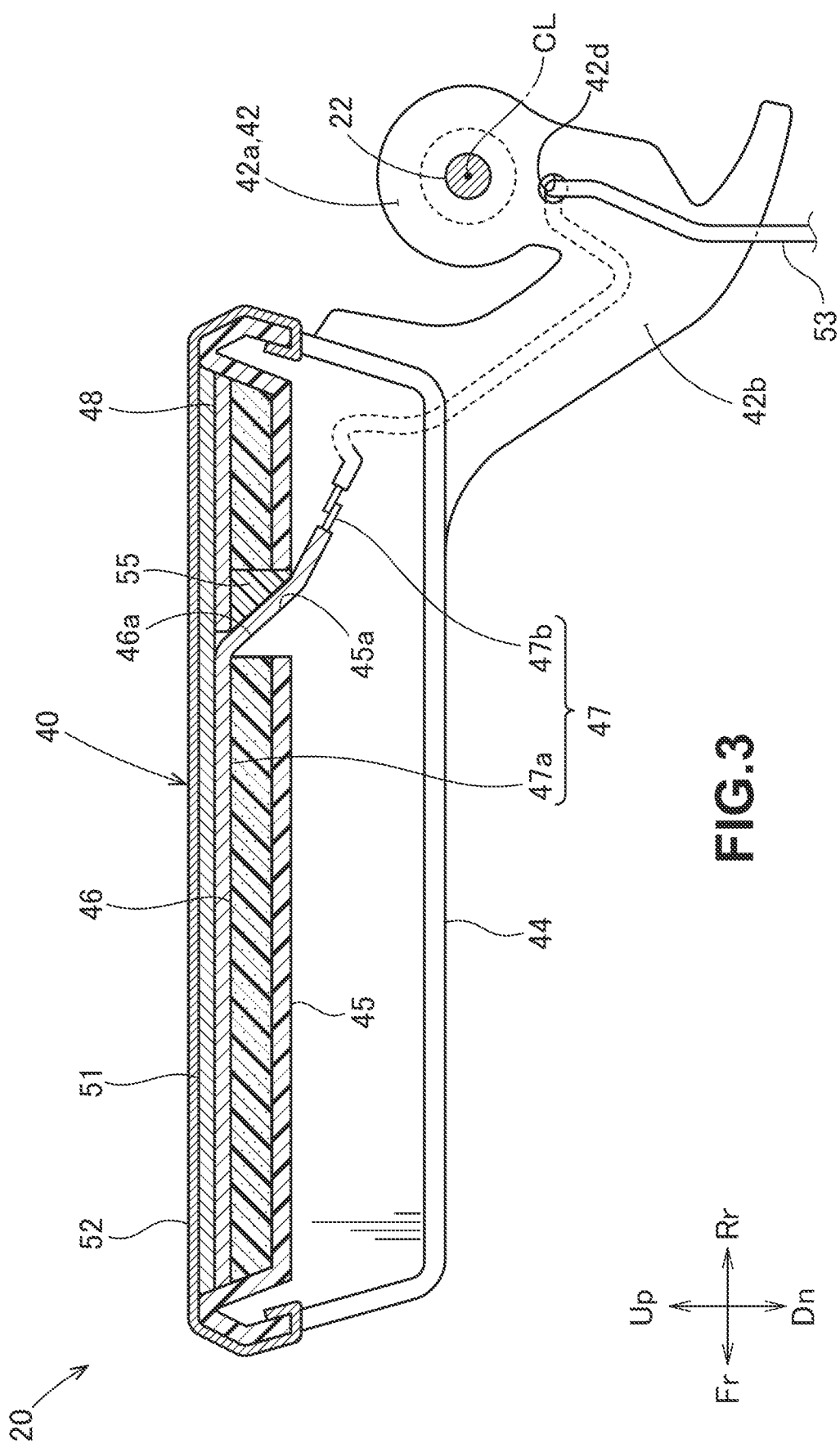
FIG. 3 is a cross-sectional view of a lid illustrated in FIG. 2 taken along the front-rear direction.

Referring also to FIG. 3, the lid 40 includes movable hinges 42 and 43 which are rotatable at or near the left and right ends of the shaft member 22, respectively, a main body 44 fixed between the movable hinges 42 and 43 and capable of opening and closing the upper portion of the storage unit 30, a base portion 45 supported by the main body 44, a cushion material 46 provided on an upper surface of the base portion 45, a heater 47 provided on a part of an upper surface of the cushion material 46 and configured to generate heat upon feeding electricity to the heater, a dummy heater 48 which is provided on a remaining portion of the upper surface of the cushion material 46, is made from the same material as the heater 47, and does not accept electricity feeding, a protective sheet 51 having a thin flat shape and placed over an upper surface of the heater 47 and the dummy heater 48 to protect the heater 47 and the dummy heater 48, a skin 52 covering the protective sheet 51, and a cable 53 whose front end (leading end) is connected to the heater 47 for feeding electricity to the heater 47.

Each of the movable hinges 42 and 43 has a base portion 42a, 43a surrounding the shaft member 22 and an arm portion 42b, 43b extending from the base portion 42a, 43a to the main body 44 and connected to the main body 44.

Further, the right movable hinge 42, which is one of the two movable hinges 42 and 43, has a first cable hole 42c through which the cable 53 continuously extends from the lower portion of the main body 44, and a second cable hole 42d which is formed below and in parallel to the axial line of the shaft member 22 such that the cable 53 extends through the second cable hole 42d. In the following description, the "movable hinge 42" refers to the right movable hinge 42.

Figure 4:
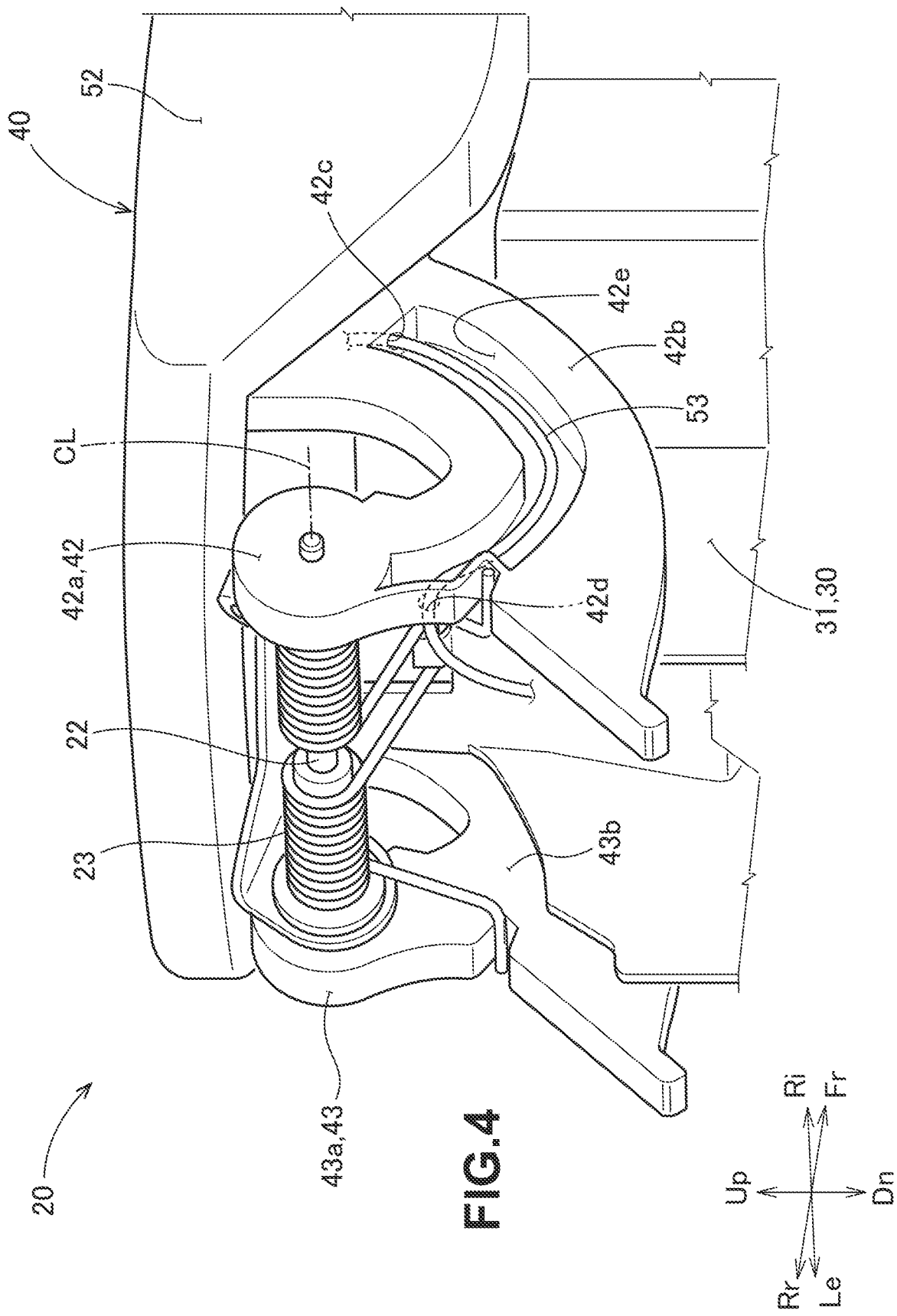
FIG. 4 is a perspective view of a hinge illustrated in FIG. 2 as viewed from the front side.

Referring to FIG. 4, a channel-like groove 42e for receiving the cable is formed on an outer face, which is an outer surface of the movable hinge 42. A part of the cable 53 is received in the cable receiving groove 42e along the outer surface of the movable hinge 42.

Referring to FIG. 3, the main body 44 is a resin member that has a tray shape and is elongated in the front-rear direction. The main body 44 has a substantially rectangular shape that is longer in a direction away from the shaft member 22 (in the front-rear direction) than in a direction parallel to the shaft member 22 (in the vehicle width direction) when viewed from above.

The base portion 45 is a member made of resin, and has a substantially "U" shape, which is a downward concave with an open upper face, when viewed in a cross-sectional view along the front-rear direction. The main body 44 and the base portion 45 create, in combination, a box shape when they overlap with each other.

The base portion 45 has a heater hole 45a that penetrates the base portion 45 from the upper surface to the lower surface of the base portion. An end portion of the heater 47 passes through the heater hole 45a. The heater hole 45a is formed at a position closer to the shaft member 22 than the center of the base portion 45 when viewed in the front-rear direction, and is a hole elongated in a direction parallel to the shaft member 22.

Any suitable material such as urethane may be used as the cushion material 46. A second heater hole 46a is formed in the cushion material 46 at a position overlapping with the heater hole 45a. The second heater hole 46a is formed in substantially the same shape as the heater hole 45a, and the end portion of the heater 47 passes therethrough.

The heater hole 45a and the second heater hole 46a are provided with a sealing member 55 that closes the holes 45a and 46a. The seal member 55 will be described later.

A sheet-like or plate-like flat heater is used as the heater 47. The heater 47 has a heat generator 47a that generates heat upon feeding electricity thereto, and a connecting portion 47b that extends from an end portion of the heat generator 47a and is connected to the cable 53.

It should be noted that the heater 47 may be referred to as an electronic component to which electricity feeding is possible. Hereinafter, the heater 47 may also be referred to as the electronic component 47. The electronic component is not limited to the heater, but it may be a capacitive switch, a light emitter that emits light upon feeding electricity, or a Peltier element that absorbs heat from the surface upon feeding electricity. Furthermore, the electronic component is not limited to the above-mentioned elements, i.e., the electronic component may be a planar (sheet-like or plate-like) element to which electricity feeding is possible.

In addition, the heater hole 45a may also be referred to as a hole 45a for the electronic component. In the following description, the second heater hole 46a is occasionally referred to as the electronic component hole 46a. A part of the electronic component 47 passes through the electronic component hole 45a.

The dummy heater 48 may be constituted by, for example, only the heat generator 47a of the heater 47. The area in which the dummy heater 48 is disposed is smaller than the area in which the heater 47 is disposed.

It should be noted that the dummy heater 48 may be referred to as a dummy electronic component whose material is the same as the electronic component 47 and which is not connected to the cable 53. Hereinafter, the dummy heater 48 may be referred to as a dummy electronic component 48. When a capacitance switch or the like is used for the electronic component 47, a capacitance switch or the like to which the cable 53 is not connected can be used as the dummy electronic component 48.

The leading end of the cable 53 is connected to the connecting portion 47b of the heater 47. The cable 53 is connected in an area surrounded by the main body 44 and the base portion 45, and extends toward the movable hinge 42 such that the cable 53 passes through the first cable hole 42c (see FIG. 4).

Referring to FIG. 4, the cable 53 extends from the first cable hole 42c to the outer surface (one of the lateral surfaces) of the movable hinge 42 such that the cable is received in the cable receiving groove 42e and extends toward the second cable hole 42d.

Referring FIG. 3, the cable 53 extends through the second cable hole 42d and returns to the inner surface (the other lateral surface) of the movable hinge 42. The cable 53 is connected to a switch or the like that can be operated by a person in the vehicle. When the person in the vehicle turns on the switch, electricity is fed to the cable 53, and the heater 47 generates heat.

It should be noted that the bending of the cable 53 can be suppressed if the shaft member 22 is cylindrical (hollow) and the cable 53 passes therethrough. However, since the maintainability is reduced, it is preferable that the cable 53 does not pass through the inside of the shaft member 22.

A soft member or the like, which contains EPDM rubber as a main component thereof, may be used as the sealing member 55. Any suitable material can be used as long as it can fill the gap between the hole 45a and the heater 47 and the gap between the hole 46a and the heater 47. The seal member 55 also serves as a stopper for suppressing movement of the heater 47.

Referring to FIG. 1, the storage device 20 includes the storage unit 30 that is provided on the sides of the seats 12 and 13 on which the persons in the vehicle can sit, and has an open upper face to receive the thing(s) therein, and the lid 40 that is swingable to open and close the upper face of the storage unit 30.

Referring to FIG. 3, the lid 40 includes the movable hinge 42 provided on the rotational axis CL such that it can rotate relative to the storage unit 30, the main body 44 which is supported by the movable hinge 42 and is capable of opening and closing the opening of the storage unit 30, the base portion 45 supported by the main body 44, the plate-like heater 47 which is provided on a part of the upper surface of the base portion 45 and whose temperature rises upon feeding electricity thereto, and the cable 53 for feeding electricity to the heater 47.

The base portion 45 has the heater hole 45a that penetrates the base portion from the upper surface to the lower surface of the base portion such that a part of the heater 47 passes through the heater hole 45a, and the heater 47 and the cable 53 are connected to each other below the base portion 45.

If the cable 53 is provided at the end of the base portion 45, it must be caught together with the skin, i.e., bending of the cable 53 occurs. Further, if the cable 53 is present between the main body 44 and the shaft member 22 when the lid 40 swings, the cable 53 is difficult to follow the movement of the lid 40 and the cable 53 often bends. Bending of the cable 53 may cause disconnection. According to the storage device 20, a part of the heater 47 passes through the heater hole 45a, and the heater 47 and the cable 53 are connected to each other below the base portion 45.

Because the heater 47 and the cable 53 are connected to each other at a portion spaced apart from the rotational axis CL, it is easy for the cable 53 to avoid a space between the main body 44 and the shaft member 22. Accordingly, it is possible to prevent the cable 53 from bending when the lid 40 swings. It is not necessary to increase the size of the movable hinge 42 in order to suppress the bending of the cable 53. Therefore, it is possible to provide the storage device 20 which is small in size and has a long service life.

Preferably, the first storage device 20 has the first cable hole 42c at the border between the main body 44 and the movable hinge 42 such that the cable 53 can extend through the first cable hole. The cable 53 passes through the first cable hole 42c and extends along the main body 44 towards the movable hinge 42. Because the cable 53 extends through the first cable hole 42c, it is possible to dispose the cable 53 in close contact with the main body 44. As a result, it is possible to prevent the cable 53 from bending when the lid 40 swings. Accordingly, it is possible to further extend the life of the storage device 20.

Preferably, the cable 53 of the storage device 20 is arranged along the outer surface of the movable hinge 42. Because the cable 53 extends along the outer surface of the movable hinge 42, it is possible to prevent the cable 53 from bending when the lid 40 swings. Accordingly, it is possible to further extend the life of the storage device 20.

Preferably, the movable hinge 42 of the storage device 20 has the second cable hole 42d that extends in parallel to the axial direction of the rotational axis CL at a position closer to the rotational axis CL than the first cable hole 42c. Further, the cable 53 passes through the second cable hole 42d such that a portion of the cable 53 is present on the back surface of the movable hinge 42.

Because the second cable hole 42d is formed and the cable 53 extends again to the back surface, the cable 53 can extend longer along the lateral face of the movable hinge 42. Also, the cable 53 that extends through the second cable hole 42d is parallel to the rotational axis CL. As a result, it is possible to prevent the cable 53 from bending when the lid 40 swings. It is possible to further extend the life of the storage device 20.

Referring to FIG. 4, the movable hinge 42 of the storage device 20 has the cable receiving groove 42e, which has a channel shape, to receive the cable 53 such that the cable 53 is received in the cable receiving groove 42e. As a result, the cable 53 can be brought into close contact with the movable hinge 42. Therefore, it is possible to prevent the cable 53 from bending when the lid 40 swings. Accordingly, it is possible to further extend the life of the storage device 20.

Preferably, the storage device 20 further includes the dummy heater 48, which is provided on the remaining portion of the upper surface of the base portion 45, and is made of the same material as the heater 47, but no electricity can be fed to the dummy heater 48. If the dummy heater 48 is not disposed, the feeling of the person in the vehicle when the arm is placed differs between the portion where the heater 47 is disposed and the portion where the heater 47 is not disposed. Because the dummy heater 48, which is made of the same material as the heater 47 and to which electricity cannot be fed, is provided, it is possible to reduce the uncomfortable feeling felt by the person in the vehicle. Thus, the comfort can be improved.

In other words, the storage devices 20 has the dummy heater 48 on the remaining area of the upper surface of the base portion 45, the dummy heater 48 is a separate member from the heater 47, at least a portion of the same material as the material of the heater 47 is used for the dummy heater 48, and the dummy heater 48 is not connected to the cable 53. Accordingly, comfort can be improved.

Preferably, the storage device 20 has the sealing member 55 that closes the heater hole 45a. It is possible to reduce the uncomfortable feeling felt when the person in the vehicle places his/her arms on the upper part of the heater hole 45a. Thus, the comfort can be improved.

Preferably, the electronic component 47 in the storage device 20 is any one of the heater, the capacitive switch, the light emitter, and the Peltier element.

Although the above-described storage device(s) according to the present invention is mounted on a passenger car, use of the storage device is not limited to a passenger car. In other words, the storage device may be mounted on a vehicle other than a passenger car, on any moving machine that carries people other than vehicles, or on a construction machine. Further, the storage device may be provided on the side of a seat other than the driver's seat.

The cable hole and the cable receiving groove through which the cable passes may be formed in either of the left and right movable hinges. That is, it is also possible to adopt a configuration in which the cable receiving groove or the like is formed in the left movable hinge 43, and the same is not formed in the right movable hinge 42.

The present invention is not limited to the embodiments as long as the operations and effects of the present invention are achieved.

What is claimed:

1. A storage device comprising:
   a storage unit having an open upper face for storing a thing therein; and a lid that is swingable to open and close the upper face of the storage unit,
wherein the lid comprises a movable hinge provided on a rotational axis such that the lid can rotate relative to the storage unit, a main body supported by the movable hinge such that the main body can open and close an opening of the storage unit, a base portion supported by the main body, a plate-like electronic component which is provided on a part of an upper surface of the base portion and to which electricity can be fed, and a cable for feeding electricity to the electronic component,
wherein the base portion has an electronic component hole that penetrates the base portion from an upper surface to a lower surface of the base portion,
wherein a part of the electronic component passes through the electronic component hole, and
wherein the electronic component and the cable are connected to each other below the base portion.

2. The storage device according to claim 1, wherein the main body comprises a first cable hole through which the cable can extend, and
the cable passes through the first cable hole and extends along the main body toward the movable hinge.

3. The storage device according to claim 1, wherein the cable is disposed along an outer surface of the movable hinge.

4. The storage device according to claim 2, wherein the movable hinge comprises a second cable hole extending in parallel to an axial direction of the rotational axis at a position closer to the rotational axis than the first cable hole, and
the cable passes through the second cable hole such that a portion of the cable is provided on a back surface of the movable hinge.

5. The storage device according to claim 1, wherein the movable hinge comprises a cable receiving groove that has a channel shape to receive the cable therein, and
the cable is received in the cable receiving groove.

6. The storage device according to claim 1, wherein a dummy electronic component, which is a separate member from the electronic component and is not connected to the cable, is provided on a remaining area of the upper surface of the base portion, and at least a part of the same material as the material of the electronic component is used for the dummy electronic component.

7. The storage device according to claim 1, wherein a sealing member is provided to close the electronic component hole.

8. The storage device according to claim 1, wherein the electronic component is any one of a heater, a capacitive switch, a light emitter, and a Peltier element.

* * * * *